(No Model.)
W. D. COOPER.
SPECULUM.
No. 350,721. Patented Oct. 12, 1886.
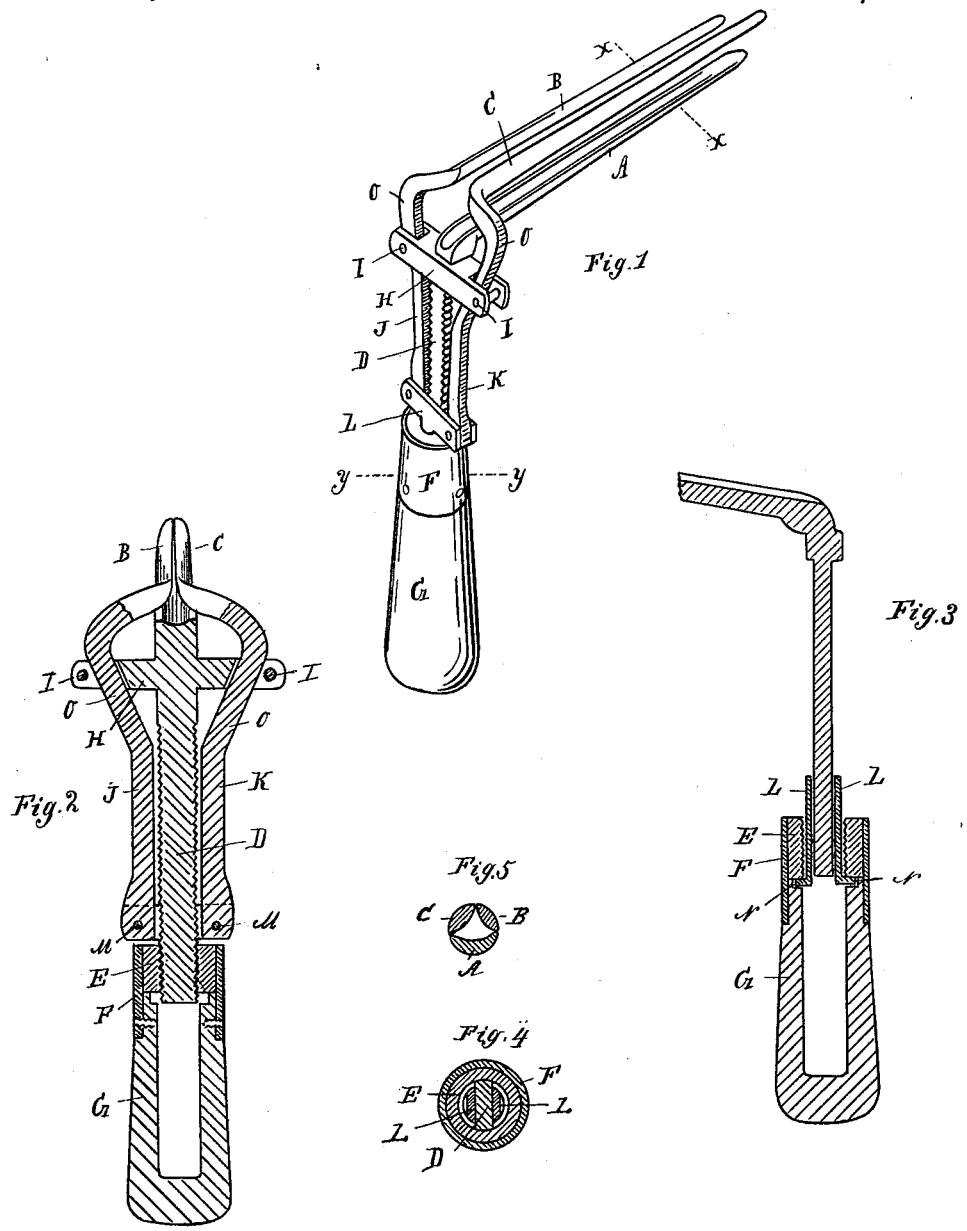
Attest:
John McDermott
Jas. R. Howie
Inventor:
William D. Cooper M.D.

UNITED STATES PATENT OFFICE.

WILLIAM D. COOPER, OF WAYNE, MICHIGAN.

SPECULUM.

SPECIFICATION forming part of Letters Patent No. 350,721, dated October 12, 1886.

Application filed May 25, 1885. Serial No. 166,659. (No model.)

*To all whom it may concern:*

Be it known that I, WILLIAM DUNN COOPER, a citizen of the United States, residing at Wayne, in the county of Wayne and State of Michigan, have invented certain new and useful Improvements in Rectal Speculums, of which the following is a description.

The nature of my invention consists in the use of certain mechanism attached to three blades or valves, to be used as a trivalve rectal speculum. By means of this mechanism, hereinafter described, the blades of the speculum may be opened and closed for the purpose of examinations and surgical operations upon the rectum. I attain these objects by the mechanism illustrated in the accompanying drawings, in which—

Figure 1 is a perspective view of the speculum partially opened. Fig. 2 is a vertical central cross-section in the plane of the shanks of the blades. Fig. 3 is a vertical central section at right angles to the section in Fig. 2. Fig. 4 is a horizontal cross-section on line $y\ y$ in Fig. 1. Fig. 5 is a cross-section on line $x\ x$ in Fig. 1 with the blades closed.

A B C are blades or dilators; D J K, shanks of blades or dilators; O O, outwardly-bent portions of the blade-shanks J and K; H, cross-bar secured to central blade-shank, D; E, screw-nut in handle; F, ferrule; G, handle; L, T-shaped yokes pivotally connecting lower ends of shanks J and K; N, upturned ends of yokes L; M, pivots; I, guide-pins.

There are three long narrow blades or valves so placed when closed as to form a stem of small diameter, (Fig. 5, cross-section,) to facilitate introduction into the rectum. Continuous and at an angle with each blade is a shank, D J K, for the purpose of separating the blades in the form of a triangle. Attached to the central blade is the middle shank, D, which is wider than it is thick, and having a screw-thread on the edges to fit the screw-nut in the handle. At the connection with the blade is a cross-bar, H, with slotted ends to admit the shanks J and K from the other blades. The shanks from the two top blades are so curved right and left that when placed in the slots of cross-bar H and held in position by guide-pins I, and pivotally connected at their lower ends by the T-shaped yokes L, they can be made to open or close the blades by turning the handle forward or backward. Connecting the lower ends of the shanks J and K to the handle G, and passing on either side of shank D, are the yokes L, the stem of which is rounded on one side and passed through the screw-nut in the ferrule and the ends turned up behind the nut, which causes the yokes to follow, and also prevents the handle from coming off when being unscrewed.

The handle is hollow, having a ferrule on the end, within which is a screw-nut which admits the shank D and stems of the yokes L. By turning the handle on the screw of shank D the end of the ferrule is made to press against the cross of the yokes L, and by this means the shanks J and K are raised and the two top blades raised and separated.

I am aware that prior to my invention the blades of rectal and other speculums were made to open and close by the use of pincher-handles, different-shaped levers, screws, &c. I therefore do not claim as my invention the mere changing of the position of the blades with or without any mechanism or less useful combination or mechanism heretofore used for such purposes.

What I do claim as my invention, and desire to secure by Letters Patent, is—

The combination, with the hollow handle G, ferrule F, and nut E within said ferrule, of the yokes L, the levers B C, having the ends of their shanks pivotally connected with said yokes, and the lever A, having threaded shank D, engaging the nut E in the handle, and guides for the upper ends of said shanks, substantially as described.

WM. D. COOPER.

Witnesses:
JAS. R. HOSIE,
JOHN MCDERMOTT.